(12) United States Patent
Himmelmann et al.

(10) Patent No.: US 9,892,372 B2
(45) Date of Patent: Feb. 13, 2018

(54) SYSTEM AND A METHOD FOR DATA COLLECTION AND MONITORING OF A DEFINED SPACE

(75) Inventors: Gunilla Himmelmann, Mölnlycke (SE); Johan Lissmats, Borlänge (SE); Andreas Wass, Borlänge (SE); Erik Lärfars, Borlänge (SE); Robert Kling, Skene (SE)

(73) Assignee: SCA HYGIENE PRODUCTS AB, Göteborg (SE)

( * ) Notice: Subject to any disclaimer, the term of this patent is extended or adjusted under 35 U.S.C. 154(b) by 0 days.

(21) Appl. No.: 14/424,590

(22) PCT Filed: Aug. 31, 2012

(86) PCT No.: PCT/SE2012/050929
§ 371 (c)(1),
(2), (4) Date: Feb. 27, 2015

(87) PCT Pub. No.: WO2014/035308
PCT Pub. Date: Mar. 6, 2014

(65) Prior Publication Data
US 2015/0206077 A1 Jul. 23, 2015

(51) Int. Cl.
*G06Q 10/06* (2012.01)
*G08B 21/24* (2006.01)
*H04Q 9/00* (2006.01)

(52) U.S. Cl.
CPC . *G06Q 10/0631* (2013.01); *G06Q 10/063118* (2013.01); *G08B 21/245* (2013.01); *H04Q 9/00* (2013.01)

(58) Field of Classification Search
CPC .............. G06Q 10/00; G06Q 10/0631; G06Q 10/063118; H04Q 9/00; G08B 21/245; G06F 3/0481
See application file for complete search history.

(56) References Cited

U.S. PATENT DOCUMENTS 7,242,307 B1 * 7/2007 LeBlond .............. G08B 21/245
340/3.1
2005/0145745 A1  7/2005 Lewis et al.
(Continued)

FOREIGN PATENT DOCUMENTS

CN       1901829 A    1/2007
CN     101949166 A    1/2011
(Continued)

OTHER PUBLICATIONS

English language translation of a Russian Office Action dated Jul. 1, 2016 issued in corresponding Russian patent application No. 2015111189 (7 pages).
(Continued)

*Primary Examiner* — An T Nguyen
(74) *Attorney, Agent, or Firm* — Drinker Biddle & Reath LLP

(57) ABSTRACT

A data collection and monitoring system for a defined space within a public or commercial facility, comprising: a plurality of sensors of which at least one sensor is arranged for monitoring the level of a consumable in connection with said space; and a data collecting unit arranged for wirelessly communicating with said sensors and furthermore arranged for communicating with a central server associated with a storage medium. The storage medium is adapted for storing and monitoring data related to said space. The system is arranged so that said data collecting unit is arranged for minimizing the amount of data transmitted, by transferring data from said sensors to said central server upon a status change of at least one of said sensors.

20 Claims, 2 Drawing Sheets

(56) References Cited

U.S. PATENT DOCUMENTS

| | | | |
|---|---|---|---|
| 2005/0171634 A1* | 8/2005 | York | A47K 5/06 700/231 |
| 2008/0053532 A1* | 3/2008 | Miller | E03F 1/006 137/386 |
| 2009/0119142 A1* | 5/2009 | Yenni | G06Q 10/06 705/7.15 |
| 2010/0205727 A1 | 8/2010 | Mühlhausen et al. | |
| 2011/0163870 A1* | 7/2011 | Snodgrass | A61B 5/1122 340/539.11 |
| 2011/0251469 A1* | 10/2011 | Varadan | A61B 5/113 600/301 |
| 2012/0056746 A1 | 3/2012 | Kaigler et al. | |
| 2012/0154169 A1* | 6/2012 | Hoekstra | G07F 17/18 340/870.01 |
| 2012/0218106 A1* | 8/2012 | Zaima | A61L 2/26 340/540 |
| 2014/0210620 A1* | 7/2014 | Snodgrass | G08B 25/007 340/539.17 |
| 2014/0225732 A1* | 8/2014 | Limbert | G08B 21/245 340/540 |
| 2015/0022361 A1* | 1/2015 | Gaisser | G08B 21/245 340/573.1 |
| 2015/0105880 A1* | 4/2015 | Slupik | H04L 12/2816 700/90 |
| 2015/0177917 A1* | 6/2015 | Hoekstra | G06F 3/0481 715/771 |
| 2015/0206077 A1* | 7/2015 | Himmelmann | G06Q 10/063118 340/870.07 |
| 2015/0227705 A1* | 8/2015 | Zaima | A61L 2/26 705/2 |
| 2015/0228181 A1* | 8/2015 | Himmelmann | G08B 21/245 340/573.1 |

FOREIGN PATENT DOCUMENTS

| | | |
|---|---|---|
| RU | 2010110911 A | 9/2011 |
| WO | WO 99/33008 A2 | 7/1999 |
| WO | WO 2005/065509 A1 | 7/2005 |
| WO | WO-2012/034590 A1 | 3/2012 |

OTHER PUBLICATIONS

Columbian Resolution 84329 (denial decision) dated Dec. 6, 2016 issued in corresponding Colombian patent application No. 15049738 (17 pages) with partial English-language translation thereof (4 pages).

First Chinese Office Action dated Jan. 26, 2017 issued in counterpart Chinese patent application No. 201280075516.1 (8 pages) and its English-language translation (9 pages).

First European examination report dated Jun. 9, 2017 issued in corresponding European patent application No. 12 883 975.0 (5 pages).

Canadian examination report dated Mar. 27, 2017 issued in corresponding Canadian patent application No. 2,882,066 (4 pages).

Second Chinese Office Action dated Sep. 29, 2017 issued in counterpart Chinese patent application No. 201280075516.1 (7 pages) and its English-language translation (8 pages).

* cited by examiner

SYSTEM AND A METHOD FOR DATA COLLECTION AND MONITORING OF A DEFINED SPACE

CROSS-REFERENCE TO RELATED APPLICATION

This application is a § 371 National Stage Application of PCT International Application No. PCT/SE2012/050929 filed Aug. 31, 2012, which is incorporated herein in its entirety.

TECHNICAL FIELD

The present disclosure relates to a data collection and monitoring system for a defined space within a public or commercial facility, including: a plurality of sensors of which at least one sensor is arranged for monitoring the level of a consumable in connection with said space; and a data collecting unit arranged for wirelessly communicating with said sensors and furthermore arranged for communicating with a central server associated with a storage medium, said storage medium being adapted for storing and monitoring data related to said space.

The present disclosure also relates to a method for collecting data and monitoring a defined space within a public or commercial facility, including monitoring at least the level of a consumable in connection with said space by means of a plurality of sensors; providing wireless communication between said sensors and a data collecting unit; providing communication between said data collecting unit and a central server associated with a storage medium; and storing and monitoring, in said storage medium, data related to said space.

BACKGROUND

Today, the need for proper hygiene, in particular in the form of hand hygiene, is widely acknowledged. For this reason, public or commercial facilities such as washrooms in public buildings, offices, restaurants, airports, hospitals, shopping malls and so on are normally provided with dispensers for various consumable goods, for example paper towels, liquid soap and toilet paper. The purpose is of course to make such consumables easily available to the guests in the washrooms.

Consumables are normally stored in said dispensers, which for this purpose are fixedly located at suitable positions in the washroom. A dispenser can for example be in the form of a holder for paper towels, a holder for toilet paper or a container for liquid soap. Other types of dispensers, for example trash cans, are also used.

The task of checking the level of each consumable, and refilling a dispenser when necessary, i.e. when the level of the consumable is low, or emptying a bin when the level of the consumable is high, is normally assigned to a cleaning staff or a janitor. One problem for a janitor is to know which dispensers that need to be refilled and how much consumable material to bring when servicing an area containing a number of dispensers. Furthermore, from a management point of view, it can be difficult to know in advance how much consumable materials should be ordered and kept in stock. For these reasons, there is a need for dispensers which are arranged for monitoring some the actual use of the consumable and for signalling in some suitable manner to a central service office that, for example, a particular dispenser needs refilling. To this end, it is known that a modern dispenser may include one or more sensors which are arranged for detecting the level of the consumable within the dispenser. Generally, such sensors can be arranged for recognizing any condition indicating that the level of a consumable is low, i.e. by detecting that the level of the consumable is below a predetermined threshold value. The sensor in question can for example be based on an infrared sensor which is arranged for detecting when the height of a paper stack, such as a stack of paper towels in a dispenser, falls below a specified low paper threshold. This threshold corresponds to a condition in which the dispenser needs refilling.

There exist also solutions in which a dispenser is arranged for automatically dispensing a consumable. An example is an automatic soap dispenser which is arranged for automatically discharging a small amount of soap when a user holds a hand under an output nozzle of the dispenser. Such a dispenser can be arranged with sensor arrangements which keep track of the number of occasions that the nozzle has been actuated. The number of occasions can then be used for estimating the amount of consumable which has been fed from the dispenser, and consequently also the remaining amount. When a predetermined minimum threshold has been reached, the dispenser can send a signal to a central service office indicating that it needs refilling.

Other types of sensors can for example be based on a light emitting diode and a photodetector which together can be used for detecting the level of a consumable within a dispenser. A further example is a counter device counting the number of turns on a toilet paper dispenser, wherein the accumulated number of turns corresponds to a certain consumption of toilet paper.

As mentioned above, a sensor which is associated with a dispenser for a consumable can be connected to a central service office, i.e. to a central computer server, so that the server is notified when a particular dispenser needs refilling. A notification relating to a dispenser low condition can then be forwarded to members of a cleaning staff, who then has the responsibility of refilling that particular dispenser as soon as possible.

A system for monitoring hygiene applicances is previously known from the patent document US 2011/0163870, which teaches a wireless system for monitoring a number of dispensers. The system comprises a number of sensors which are connected to a hub, i.e. a data collecting unit. The hub is connected to a gateway which communicates, via a cellular network, with a remote server which is associated with a database.

A particular problem which is relevant with regard to a monitoring system of the above-mentioned type is that a system may involve a relatively large number of sensors and data collecting units. This means that the data traffic, i.e. the flow of information related to the consumption of consumables, dispenser operation, visitor counting, etc. between the various units such as the sensors and the data collecting units, can be both intensive and costly, and may also require well-dimensioned and costly server and database systems.

This means that a problem involved with previously known solutions is that they are not always cost-effective with regard to data communication cost and computer infrastructure.

SUMMARY

Consequently, it is desire to provide a data collection and monitoring system for a defined space within a public or commercial facility which is cost-effective and energysaving, in particular with regard to the cost for data transmission between various units forming the system.

A first aspect relates to a data collection and monitoring system for a defined space within a public or commercial facility, including a plurality of sensors of which at least one sensor is arranged for monitoring the level of a consumable in connection with said space; and a data collecting unit arranged for wirelessly communicating with said sensors and furthermore arranged for communicating with a central server associated with a storage medium, said storage medium being adapted for storing and monitoring data related to said space. Said data collecting unit is arranged for minimizing the amount of data transmitted, by transferring data from said sensors to said central server upon a status change of at least one of said sensors.

This allows for a cost-effective solution for transmitting data in a monitoring system for a space, such as a washroom, having one or more dispensers. More precisely, since the amount of data traffic can be heavily reduced, the cost for such communication will be decreased. This is particularly the case in systems involving many different spaces having sensors which all communicate, through data collecting units, with a central server and a storage medium such as a database or any other medium capable of storing information. Also, the system leads to a decrease in the load imposed on the data transmission components and the networks used. Also, it decreases the amount of errors which may occur during data transmission, which means that it contributes to a highly efficient, reliable and sustainable system for monitoring and collecting data.

According to an embodiment, a traffic sensor is arranged in the vicinity of the entrance of the space. The traffic sensor suitably communicates with said data collecting unit and is adapted for detecting traffic data, i.e. information related to the number of visitors of said space within a selected time period. The system can then be arranged for transmitting the traffic data from the traffic sensor to the central server upon said status change, said status change corresponding, for example, to a condition when at least one sensor for detecting the level of a consumable has detected that a given threshold has been reached.

The system can also be arranged so that data from the traffic sensor is transferred to the central server upon a status change of the traffic sensor. Such a status change may for example correspond to a situation where a given number of visitors, for example 1000 visitors, has entered the washroom during a certain time period and there is a need for refilling the dispensers with consumables. In certain embodiments, at such an occasion, the data from the other sensors, i.e. the sensors which directly measures the level of a consumable, will also be transmitted to the central server. This also contributes to a decrease in data communication and consequently a decrease in cost. Accordingly, the method decreases the load placed on the data transmission components and the networks used and decreases the amount of errors occurring during data transmission, and consequently contributes to an efficient, reliable and sustainable method for monitoring and collecting data.

The system can be arranged so that a certain change or amount of changes, or even a pattern of changes, which are recorded by a sensor can reach a set threshold level which also corresponds to a level of a consumable. Such a situation can be said to correspond to a status change. A certain change or a given amount of changes detected by a sensor can consequently trigger a status change and the data collecting unit then transfers data to the central server before or when a certain time period has lapsed. Also, a status change can correspond to a situation in which there has been at least one change or a certain amount of changes recorded by at least one of the sensors within a certain time period. The given time period can be set at different times depending, for example, on the location and the frequency of use of a consumable. At the end of that time period the data collection unit then transfers data from the sensors depending on if there has been a change recorded by a sensor or if there has been a certain amount of changes recorded by a sensor.

Also disclosed is a method for collecting data and monitoring a defined space within a public or commercial facility, including monitoring at least the level of a consumable in connection with said space by means of a plurality of sensors; providing wireless communication between said sensors and a data collecting unit; providing communication between said data collecting unit and a central server associated with a storage medium; and storing and monitoring, in said storage medium, data related to said space. The method includes minimizing the amount of data transmitted, by transferring data from said sensors to said central server upon a status change of at least one of said sensors.

Furthermore, the central server can be arranged for collecting information from the data collecting unit at any time or according to a suitable time schedule. For example, this data collecting and transfer to the server can be set to be initiated, for example, once every 24 hours. This transfer is then initiated independently of any status changes reported by the data collection unit.

BRIEF DESCRIPTION OF DRAWINGS

Embodiments of the invention will be described below with reference to the enclosed drawings, in which.

DETAILED DESCRIPTION OF PARTICULAR EMBODIMENTS

Figure 1:
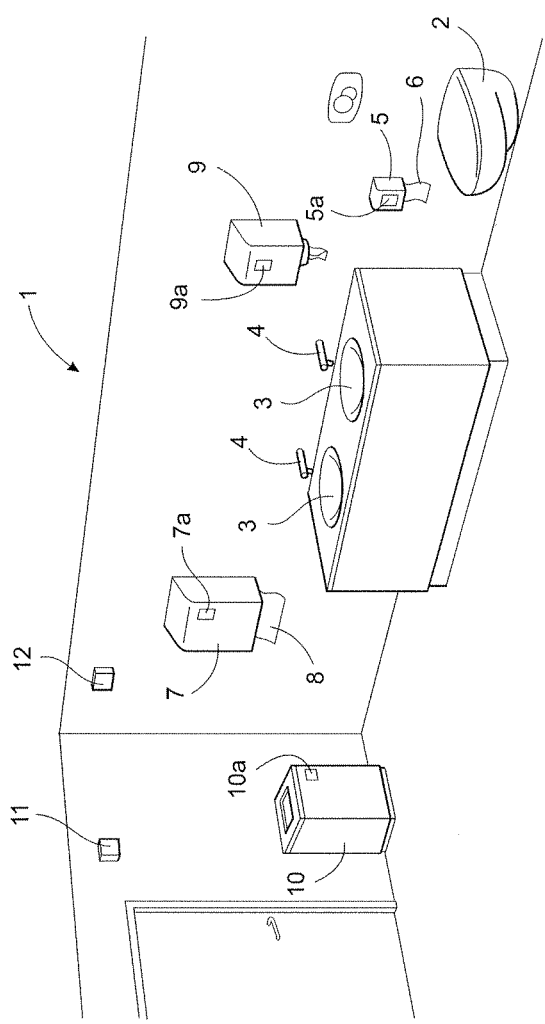
FIG. 1 is a perspective view of a typical public or commercial space in the form of a washroom in which an embodiment of the invention can be used.

FIG. 1 is a perspective view of a washroom 1 in which a system according to an embodiment of the invention can be used. As shown in FIG. 1, the washroom 1 typically may contain a toilet seat 2, a number of sinks 3 and a corresponding numbers of water taps 4 being associated with the sinks 3.

A first dispenser 5 for toilet paper 6 is arranged in the vicinity of the toilet seat 2 and a second dispenser 7 for paper towels 8 is arranged in the vicinity of the sinks 3. Also, a third dispenser 9 for soap is arranged in the vicinity of the sinks 3. Furthermore, a fourth dispenser 10 for trash is arranged in the washroom 1.

The washroom 1 with its dispensers 5, 7, 9, 10 is provided with a number of sensors. In particular, the first dispenser 5 is provided with a first sensor 5a, which is indicated in a schematical manner in FIG. 1 and which is arranged for detecting the remaining amount of toilet paper 6 in the dispenser 5. Furthermore, the second dispenser 7 is provided with a second sensor 7a which is arranged for detecting the remaining amount of paper towels 8 in the dispenser 7. Furthermore, the third dispenser 9 is provided with a third sensor 9a which is arranged for detecting the remaining amount of soap in the dispenser 9.

The above-mentioned sensors 5a, 7a, 9a are suitably arranged for detecting the level, i.e. the remaining amount of a consumable in each respective dispenser 5, 7, 9. In this context, the term "consumable" should not be interpreted as being limited to soap, paper towels and toilet paper only, but may also include other types of products such as wiping sheets, facial tissues, napkins, surface wipes, web wipes etc., and also other types of liquids such as for example hair shampoo, shower lotion and cleaning detergents.

Also, according to the embodiment, the fourth dispenser 10 in the form of a waste bin can be provided with a fourth sensor 10a which is arranged for detecting the amount of a consumable used and placed as waste in the dispenser 10.

The washroom 1 is suitably also equipped with a fifth sensor 11 in the form of a traffic sensor, i.e. a sensor for detecting the number of persons entering the washroom 1. Such a traffic sensor 11 can suitably be positioned on a wall or in a door entrance, as shown in FIG. 1. The traffic sensor 11 can be based on a light emitting diode which cooperates with a photodetector (not shown in FIG. 1). Alternatively, it can be based on other known technology for detecting each visitor entering the washroom, thereby enabling detection or counting of the number of visitors. Other examples of traffic sensors is a trigger sensor triggered by the opening of a door to the washroom 1, a motion sensor triggered by movement of a visitor within the washroom 1 and a light sensor triggered by the lights being turned on in the washroom 1.

In summary, the washroom 1 is provided with a number of sensors 5a, 7a, 9a, 10a, 11, of which at least one sensor (but suitably several) are arranged for monitoring the level of a consumable in connection with said washroom 1.

It should be noted that the term "sensor" should be interpreted as a broad concept, comprising both sensors actually measuring the level of a consumable (for example, the level of liquid soap) in a dispenser and also sensors which measure parameters which in turn can be regarded as a measurement of the consumable level. For example, a sensor could be in the form of a device which measures the use of a consumable, i.e. a sensor detecting the number of paper towels which have been fed out of the corresponding dispenser. Such a measure can be said to correspond to the level of the consumable. This would assume that the dispenser in question is reset in some manner when it is filled. Furthermore, a sensor could also be in the form of a visitor registration sensor, i.e. a device for counting the number of visitors to the washroom. This measure could also be regarded as an equivalent to the level of the consumables which are used within the washroom. Furthermore, the level of trash in the waste bin 10, which can be detected by means of the corresponding fourth sensor 10a, can be regarded as a measure of the level of consumables in the corresponding dispensers 5, 7, 9 due to the fact that it is possible to determine at least a rough estimate of the level of consumables based on the amount of trash that has been generated and thrown into the waste bin 10.

The sensors 5a, 7a, 9a used for detecting the actual level of a consumable can be of ultrasonic type, i.e. a sensor which allows a distance from a fixed point within a dispenser and up to a stack of sheet product to be determined. From this determination, a measure of the level of the stack can be obtained. The sensors 5a, 7a, 9a can be based on optical technology, i.e. on any suitable type generating light in the ultraviolet, infrared or visible range, such as a lamp, laser or light emitting diode (LED), which cooperates with a photo detector.

Other types of sensors can for example be based on a light emitting diode and a photodetector which together can be used for detecting the level of a consumable within a dispenser. A further example is a counter device counting the number of dispensing actions or other actions applicable in order to detect the level of a consumable within a dispenser. For example, a counter device could be arranged for counting the turns on a toilet paper dispenser, wherein the accumulated number of turns corresponds to a certain consumption of toilet paper. Yet another example of a sensor is a traffic counter sensor, i.e. a sensor for counting the number of patrons or users visiting the washroom. The number of visitors in a washroom during a given time period can then be used as an estimate of the level of consumables in the dispensers.

The sensors 5a, 7a, 9a, 10a, 11 are connected wirelessly to a data collecting unit 12, which can be positioned for example on a wall or in the ceiling or on any other suitable surface in the washroom 1. The data collecting unit 12 can also be positioned outside the washroom 1, provided that the distance between the data collection unit 12 is sufficiently short so as to maintain a wireless communication between the data collection unit 12 and the sensors 5a, 7a, 9a, 10a, 11. The data collecting unit 12 will be described in detail below with reference to FIG. 2.

Figure 2:
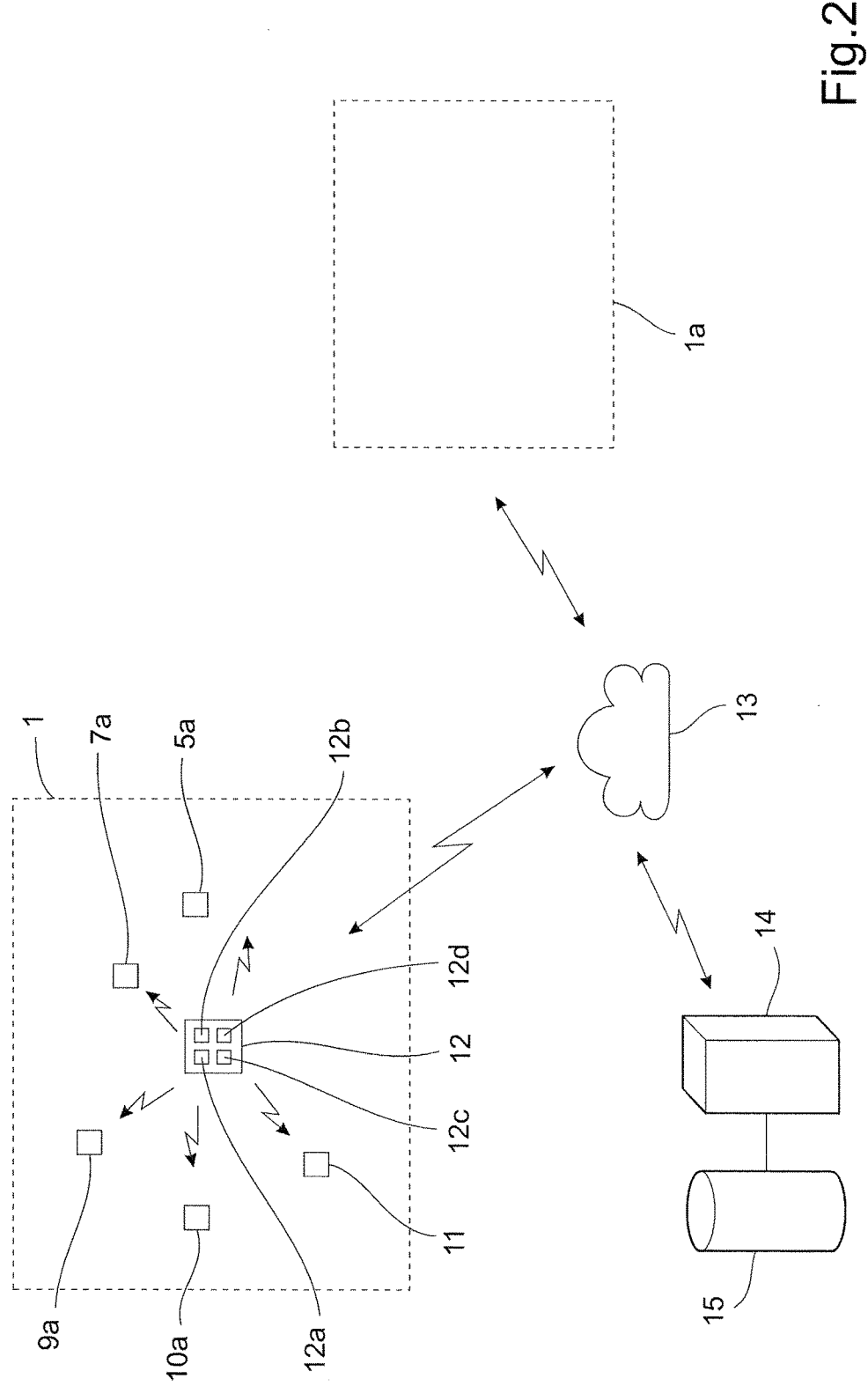
FIG. 2 is a schematical and simplified view of a data collection and monitoring system according to an embodiment of the invention.

With reference to FIG. 2, which is a schematical view of a system according to an embodiment of the invention, a space such as the washroom 1 described above is shown in a simplified manner with a broken line.

It should be noted that the space 1 indicated in FIG. 2 can be in the form of a confined area such as a washroom or restroom area for men or women within a public or professional facility. Examples of such public facilities are public buildings, offices, restaurants, airports, train stations and similar environments. Alternatively, it can be a washroom in some other type of commercial facility such as a hotel, a public building, a shopping mall or similar. It can also be a department within a hospital, for example in the form of a dedicated washroom area in a hospital.

As explained above, the washroom 1 shown in FIG. 2 contains a first sensor 5a for detecting the amount of toilet paper, a second dispenser 7a for detecting the amount of paper towels and a third sensor 9a for detecting the amount of soap. Furthermore, the washroom 1 contains a fourth sensor 10 for detecting the level of trash and a fifth sensor 11 in the form of a traffic sensor or visitor registration sensor.

According to the embodiment, all the sensors 5a, 7a, 9a, 10, 11 are arranged to communicate wirelessly with the data collecting unit 12. Certain sensors, i.e. in this case sensors 5a, 7a, 9a and 10a, are arranged for monitoring the actual level of a consumable in connection with the washroom 1. In contrast, the fifth sensor 11, i.e. the traffic sensor, and the fourth sensor 10a might also work this way in that it does not measure the actual consumable level, but can be used for estimating said consumable level based on other measurements.

The data collecting unit 12, which is shown in a simplified manner in FIG. 2, includes at least one processing unit 12a, at least one memory unit 12b, at least one short range communication unit 12c and at least one long range communication unit 12d. The processing unit 12a is arranged to execute instruction sets for operating the data collecting unit 12 so as to collect data from the different sensors 5a, 7a, 9a, 10, 11 and to store said data in the memory unit 12b. Said data can also be relayed to a central server 14 by means of the long range communication unit 12d and via a communication network 13 such as an Internet connection. The data collecting unit 12 receives data from the sensors by means of the short range communication unit 12c and through the use of a communication protocol which is common with the sensors 5a, 7a, 9a, 10, 11.

The processing unit 12a is arranged for relaying the data via the long range communication unit 12d and via the communication network 13 to the central server 14. This means that the processing unit 12a operates as a bridge between the short range communication unit 12c and the long range communication unit 12d. It should be mentioned here that the central server 14 is associated with a storage medium 15, such as a database, for storing the received data. The long range communication unit 12d may operate with any suitable type of communication mode or protocol, e.g. GSM, GPRS, EDGE, UMTS, HSDPA, LTE, WCDMA, CDMA2000, and so on, as understood by the skilled person and the communication network may be an infrastructure network for the above-mentioned communication protocols and/or a packet based communication network such as the Internet or an intranet. Furthermore, the short range communication unit 12c is constituted by a radio transceiver which can be based on any suitable communication mode or protocol, e.g. a wireless MAC protocol.

Furthermore, the data collecting unit 12 communicates wirelessly, for example via a frequency band corresponding to 2.4 GHz. This frequency band allows a very long battery lifetime and allows the use of standard components, which is an important factor for reducing the manufacturing cost of the sensors. The communication of the data collecting unit 12 can be made compatible with the IEEE 802.15.4 standard which specifies the physical layer for low-rate wireless personal area networks. It should be noted, however, that the principles of the invention can be applied using other frequency bands too, for example 868 MHz, 915 MHz, 433 MHz, which are known frequency bands which are suitable for communication of the kind mentioned above.

Also, in order to maintain a secure data communication, said wireless communication is maintained via a double antenna arrangement (not shown in the drawings) on said data collecting unit 12. Several antennas can of course be used. It is known that in indoor environment situations, some spots may have very low signal strength and signal quality. The fact that two antennas are used according to the embodiment, and assuming that the two antennas are positioned a certain distance apart from each other, it is very likely that at least one of the antennas have sufficient signal.

In summary, the data collection unit 12 is arranged for communicating with the sensors 5a, 7a, 9a, 10, 11 and for collecting data relating to the operation of these sensors 5a, 7a, 9a, 10, 11. More precisely, data from the sensors can be transmitted to the data collection unit 12 on a regular basis, for example every 8 or 10 minutes, so as to deliver data indicating the level of each consumable in its corresponding dispenser.

The data collecting unit 12 is furthermore arranged for collecting and sending relevant data to the central server 14 so that said data can be stored in the storage medium 15 and be monitored and processed in a suitable manner in the central server 14. In order to provide a cost-effective, reliable, efficient and sustainable system, in particular as regards the data communication, the data collecting unit 12 is arranged for minimizing the amount of data transmitted, by transferring data originating from the sensors upon a status change of at least one of the sensors. In other words, the data collecting unit 12 is suitably arranged so as to transmit sensor data to the server 14 only at certain occasions, i.e. when at least one sensor has indicated that the level of a corresponding consumable has reached at least one predetermined, set threshold level. Such a threshold level suitably corresponds to a situation, a "status change", which is used for determining a cause of action, for example refilling the dispenser in question. Consequently, when the level of the consumable is below a certain level, this "status change" corresponds to a need to refill the dispenser. The invention is however not limited to such a situation only. This means that the expression "status change" may correspond to other situations also. For example, the term "status change" may correspond to a situation wherein there is a general need for obtaining information of the status of consumable levels or refiling a consumable independently of its actual level. Also, the term "status change" may correspond to a situation wherein refilling of a consumable in said washroom has occurred. The term "status change" may also correspond to a situation wherein refilling is needed immediately (i.e. the level of consumable is very low, i.e. the dispenser is or almost empty) or wherein refilling is needed within a few days (i.e. the level of consumable is relatively low, possibly "half full").

Furthermore, a "status change" may also correspond to a situation in which at least one of the sensors 5a, 7a, 9a, 10a, 11 has detected an occurrence of a particular change, or a predetermined amount of changes, or a predetermined pattern of changes, within a set time period. Such a detectable change could be related to any change in any of the sensors 5a, 7a, 9a, 10a, 11. Such a detectable change could for example be that a certain number of visitors have entered the washroom 1, which could be detected by the traffic sensor 11. The data collecting unit 12 could then be arranged to decide whether sensor data should be forwarded to the central server 14, depending, for example, on the number of visitors that have been detected during a specific time period.

Being arranged for transmitting sensor data to the central server 14 only upon a status change can be combined with a schedule in which sensor data is transmitted to the central server 14 for example once every 24 hours.

Also, according to an embodiment, an alert signal indicating a low level within a particular dispenser can be sent not only to a central server but also to a mobile telecommunications device, such as a mobile phone, a table computer, a PDA etc., so that a member of a cleaning staff can be informed of the requirement to refill the dispenser. The alert may be sent via a text message, an email, an automated voice call or an alert on a webpage that the mobile device is connected to. The alert can also be displayed on a graphical user interface of a computer used by a janitor or member of a cleaning staff.

In summary, the data collecting unit 12 can be arranged for minimizing the amount of data transmitted by transferring data from the sensors 5a, 7a, 9a, 10a, 11 to the central server 14 and storage medium such as a database 15 when a status change occurs in at least one of these sensors 5a, 7a, 9a, 10a, 11. In this manner, the data traffic can be reduced considerably, which means that cost savings can be made in a system according to embodiments of the invention. Another advantage is that sensor data being stored in the storage medium 15 can be used on a management level for ordering new consumable goods, assigning various teams of cleaning staff to different departments etc.

As described above, the system includes a traffic sensor 11 which sends data related to the number of visitors to the data collecting unit 12. According to an embodiment, the system is arranged so that said data from the traffic sensor 11 is sent to the server 14 upon a status change. This means that the embodiment allows for two different scenarios; firstly, a status change of any sensor 5a, 7a, 9a, 10, 11 may cause that transmission of data from the data collection unit, and suitably also data related to said traffic sensor 11 is sent simultaneously, i.e. at said status change. Secondly, a status change related to the traffic sensor 11, i.e. corresponding to a certain number of visitors having been registered, causes data from the traffic sensor 11 to be sent to the server, wherein data from the other sensors 5a, 7a, 9a, 10 is also sent to the server at said status change.

The traffic sensor 11 can be arranged to transmit data (regarding the number of visitors) to the data collection unit 12 only when a certain number of visitors has entered the washroom. Alternatively, the traffic sensor 11 can be arranged to transmit data to the data collection unit 12 at a certain regular interval, for example every 5 minutes. The data collection unit 12 can then determine whether the "status change" has occurred, for example if a set number of visitors has entered the washroom, and may send the traffic sensor data to the server 14 if this is the case.

With regard to the hardware of the sensors 5a, 7a, 9a, 10, they can be manufactured in the form of separate units having non-replaceable batteries which are intended to last the entire lifetime of the sensors.

As indicated in FIG. 2, at least one further space 1a such as another washroom can be connected to the same central server 14 via an Internet connection. Generally, the server 14 could be connected to any number of spaces.

The invention is not limited to the embodiments described above but should be limited only by the scope of the appended claims. For example, a data collecting unit to be used in embodiments of this invention must not necessarily be located inside the washroom, but can be placed outside the washroom. Also, a sensor for a particular dispenser must not necessarily be positioned inside the dispenser. The kind of batteries used or not used can be chosen freely.

Furthermore, a space 1 does not have to be a washroom. More precisely, the system can be intended to be used in many types of spaces such as hospitals, hotels and other public and/or professional facilities.

Finally, as an alternative to a communication route which extends from the sensors, to the data collection unit, and then further to the central server, a relay station (not shown in the drawings) can be used. This means that a sensor may communicate with such a relay station, which in turn passes the signals on to the data communication unit. Also, the data communication unit communicates with the central server in order to store the relevant data.

The invention claimed is:

1. A data collection and monitoring system for a defined space within a public or commercial facility, comprising:
   a plurality of sensors of which at least one sensor is arranged for detecting the remaining amount of a consumable in a dispenser associated with said sensor and being positioned in said space;
   a data collecting unit comprising:
      at least one short range communication unit arranged to receive data from said plurality of sensors,
      a data collecting unit storage medium adapted for storing said data from said plurality of sensors, and
      at least one long range communication unit arranged to relay said data to a central server; and
   said central server associated with a central server storage medium, said central server storage medium being adapted for storing and monitoring said data related to said space from said plurality of sensors;
   wherein said data from the plurality of sensors is transmitted to the data collection unit on a regular basis, and wherein said data collecting unit is arranged and configured to transmit all of said data from said plurality of sensors stored in said data collecting unit storage medium to said central server upon a status change detected by at least one sensor of said plurality of sensors corresponding to said at least one sensor indicating that the level of a corresponding consumable has reached at least one predetermined threshold level.

2. The data collection and monitoring system according to claim 1, further comprises a traffic sensor communicating with said data collecting unit and being adapted for detecting traffic data related to the number of visitors of said space, wherein said data collecting unit is arranged and configured to transmit said traffic data from said traffic sensor to said central server upon said status change.

3. The data collection and monitoring system according to claim 1, wherein said space is a hygiene facility.

4. The data collection and monitoring system according to claim 2, wherein said traffic sensor is arranged in the vicinity of the entrance of said space.

5. The data collection and monitoring system according to claim 1, wherein said status change corresponds to a situation in which the level of said consumable reaches at least one set threshold level.

6. The data collection and monitoring system according to claim 1, wherein said status change corresponds to a situation in which at least one of said sensors has recorded the occurrence of a change, or a predetermined amount of changes, or a predetermined pattern of changes, within a set time period.

7. The data collection and monitoring system according to claim 2, wherein said traffic sensor is arranged for transmitting said traffic data when a set number of visitors has entered said space during a set time period.

8. The data collection and monitoring system according to claim 1, wherein said status change corresponds to a situation where there is a need for refilling a consumable in said space.

9. The data collection and monitoring system according to claim 1, wherein said status change corresponds to a situation wherein refilling of a consumable in said space has occurred.

10. The data collection and monitoring system according to claim 1, wherein each of said sensors of the plurality of sensors comprises a non-replaceable battery.

11. The data collection and monitoring system according to claim 1, wherein said data collecting unit wirelessly communicates with said plurality of sensors via a frequency band corresponding to 2.4 GHz.

12. The data collection and monitoring system according to claim 1, wherein said data collecting unit wirelessly communicates with said plurality of sensors via at least two antennas forming an antenna arrangement on said data collecting unit.

13. A method for collecting data and monitoring a defined space within a public or commercial facility, comprising:
   detecting the remaining amount of a consumable in a dispenser associated with at least one sensor of a plurality of sensors in said space;
   providing wireless communication between said plurality of sensors and an at least one short range communication unit in a data collecting unit;
   providing communication between at least one long range communication unit of said data collecting unit and a central server associated with a storage medium;
   storing and monitoring, in said storage medium, data related to said space;

transmitting data from the plurality of sensors to the data collecting unit on a regular basis;

detecting a status change by at least one sensor of said plurality of sensors; and transferring all of said data from said plurality of sensors stored in a data collecting unit storage medium in said data collecting unit to said central server upon said status change detected by said at least one sensor of said plurality of sensors corresponding to said at least one sensor indicating that the level of a corresponding consumable has reached at least one predetermined threshold level.

14. The method according to claim 13, further comprises detecting traffic data related to the number of visitors of said space, and transmitting said traffic data from the data collecting unit to said central server upon said status change.

15. The method according to claim 13, wherein said status change is initiated when the level of said consumable reaches at least one set threshold level.

16. The method according to claim 13, wherein said status change is initiated upon at least one of said sensors recording the occurrence of a change, or a predetermined amount of changes, or a predetermined pattern of changes, within a set time period.

17. The method according to claim 14, wherein said traffic data is transmitted to the data collecting unit when a set number of visitors has entered said space during a set time period.

18. The method according to claim 13, wherein said status change is initiated upon a need for refilling said consumable in said space.

19. The method according to claim 13, wherein said status change is initiated when refilling of a consumable in said space has occurred.

20. The method according to claim 13, wherein providing wireless communication between said at least one short range communication unit in said data collecting unit and said plurality of sensors is via a frequency band corresponding to 2.4 GHz.

* * * * *